United States Patent
Armstrong, Jr. et al.

[15] 3,690,771
[45] Sept. 12, 1972

[54] METHOD AND APPARATUS FOR INSTRUMENTALLY SHADING METALLIC PAINTS

[72] Inventors: William S. Armstrong, Jr., Phoenixville; Webster H. Edwards, Springfield, both of Pa.; Joseph P. Laird, Wilmington, Del.; Roy H. Vining, Swarthmore, Pa.

[73] Assignee: E. I. du Pont de Nemours and Company, Wilmington, Del.

[22] Filed: April 7, 1970

[21] Appl. No.: 26,269

[52] U.S. Cl. .................... 356/176, 250/226, 356/74, 356/96
[51] Int. Cl. .............................. G01j 3/46, G01j 3/42
[58] Field of Search ...356/96, 176, 178, 74; 250/226

[56] References Cited

UNITED STATES PATENTS 3,506,365   4/1970   Hunt et al. .................... 356/96

OTHER PUBLICATIONS

"Color Technology" by Marshall; Chemical Engineering, Aug. 12, 1968; pg. 148– 156
Digital Computer Color Matching; Allen; American Dyestuff Reporter, pg. 57– 63.
Paint Testing Manual; Gardner & Sward; Gardner Laboratory, Inc.; Bethesda, Maryland, March 62; pg., 21, 22, 12, 13.

*Primary Examiner*—Ronald L. Wibert
*Assistant Examiner*—V. P. McGraw
*Attorney*—John E. Griffiths

[57] ABSTRACT

A system which can be used in the paint manufacturing industry to shade batches of paint to desired standard color based on standard values for the standard color by use of physical differences of the paint to be shaded and the standard paint determined from tristimulus values derived from panels sprayed with the respective paints.

6 Claims, 1 Drawing Figure

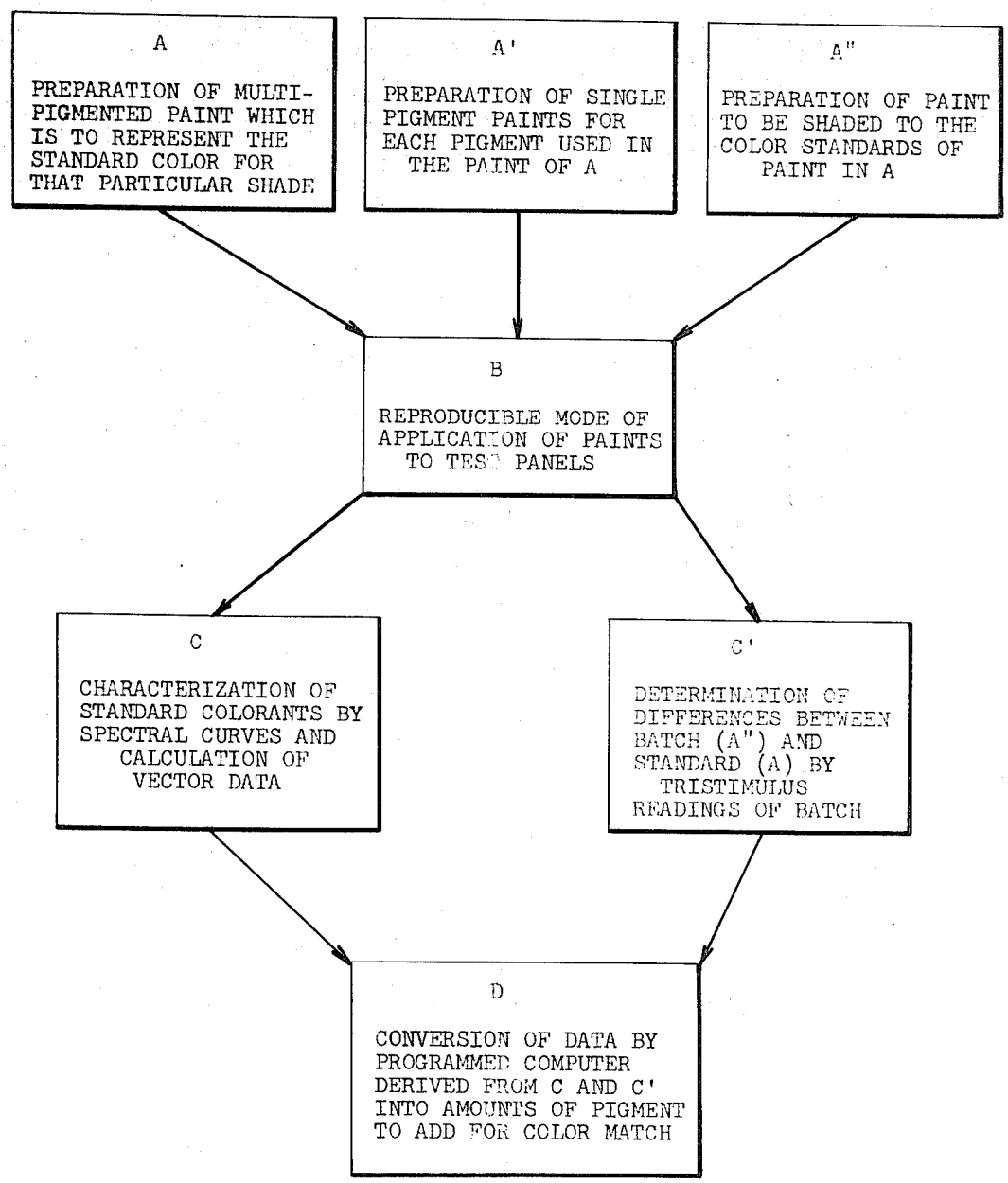

METHOD AND APPARATUS FOR INSTRUMENTALLY SHADING METALLIC PAINTS

BACKGROUND OF THE INVENTION

In the manufacture of pigmented finishes one rarely if ever achieves a satisfactory color match versus a color standard without an adjustment process known as shading. Shading usually involves a relatively minor but critical manipulation of the formula pigment composition, correcting for the cumulative effects of manufacturing variables on pigment dispersions.

Traditionally, the shading process has been carried out by highly skilled and trained personnel who require extensive on-the-job experience to achieve proficiency in their craft. Since visual shading at best is an art, effective administration of the process was difficult and, in many cases, the actual capacity of a plant was tied to the proficiency of the shaders. Displacement of the visual process has been slow and the lack of progress can be attributed to many factors. Visual color matching techniques have enjoyed a comparatively high measure of efficiency, a result of constantly refining procedures developed through the centuries. In addition, the normal eye is extremely sensitive to subtle color differences and it is only in the past 15 to 20 years that practical optical instrumentation has been developed that can rival or exceed the eye in measuring small color differences. While investigators postulated mathematical expressions which attempted to characterize the optical characteristics of pigmented films, practical application was restricted due to the complexity of the mathematics involved and the sensitivity of instruments required. The computer age has changed this.

The evolution and availability of high-speed, low cost digital computers has generated a new interest in a series of equations put forth by Kubelka and Munk in 1931. This hypothesis relates the effect of a scatter component (S) and an absorption component (K) in terms of measured reflectance. The popularity of the Kubelka-Munk equations among practical colorists may be traced directly to the definition of reflectance characteristics in terms of absorption and scattering coefficients. These characteristics were readily visualized and understood by the majority of colorists; whereas, prior mathematical treatments of color, though mathematically correct, were not understood nor completely trusted. Despite this advantage, the complexity and volume of calculations associated with the application of the hypothesis precluded usage until the advent of modern computational equipment. The application of Kubelka-Munk technology will be discussed in more details later.

Preliminary attempts were made to both formulate and to shade colors using spectrophotometric and tristimulus difference measurements but were successful in resolving only some of the commercial color problems. Progress was made in the area of shading nonmetallic colors as the reflectance of the paint was constant at varying viewing angles.

The advent of the high glamor metallic finishes desired by the automotive industry created a perplexing problem. This type of finish exhibited a "two-tone" or "flop" effect, i.e., the color appeared different at different viewing angles. The techniques in use up to that time were unable to cope with this variable which was due to the reflectance of the metal particles dispersed in the paint film.

DESCRIPTION OF THE DRAWING

In its broadest scope the automated shading system can be illustrated by the use of the drawing. Block A represents the manufacture of a batch of paint which is selected upon as being the standard to which subsequent batches will be shaded. Block A' represents the preparation of paints containing only one pigment. This procedure is followed for each pigment which is a component of the paint of block A. At B the paints from A and A' are applied to test panels by any method which will be uniform and reproducible in terms of the visual appearance of the paint for subsequent applications.

Block C represents a means of obtaining colorant constants, in terms of Kubelka-Munk coefficient. Colorants are defined as a dispersion of pigment color, however, the system could function by determinations on pigments independent of any dispersion medium. The constants obtained through spectrophotometric measurements on the panels of B coated with the single pigment paints prepared in block A' are the absorption (K) and scattering (S) coefficients. These data are utilized to calculate the color adjustment or vector data (partial derivatives) for formulas (recipes) and are basic to the actual calculation of a shading adjustment— step D.

The aforementioned partial derivatives which are color constants for a given formula composition are punched into computer input cards using a binary coding system. The entire computer interaction is represented by block D. The computer input cards can then be fed into a computer specially programmed to handle linear programming. This computer is programmed so as to return a minimal positive solution in amounts of specific colorant to be *added* to the batch to bring it up to the color standard.

A" represents preparation of a batch of paint for which color standardization is sought relative to a known standard color which was prepared in A.

A sample of the paint prepared in A" is coated on a test panel using the same technique as B.

Block C' represents determination of tristimulus values which in our coordinate system are designated G.R.B. values for the light reflectance exhibited by the batch test panel. These values can be obtained by use of a spectrophotometer or colorimeter modified for metallic measurements. Six values are used to compute the differences between the test panel and the standard utilizing a coordinate system such as C.I.E.[1] ([1]C.I.E. ("Commission Internationale del l'Eclaige" further described in "Color Science", pages 238–321 by Gunter Wyszecki and W. S. Stiles published by J. Wiley & Sons, Inc. (1967).) or Modified Adams System.

These color differences are fed into the computer along with the computer input card for the respective standard formula (recipe) to which color shading of the test batch is oriented. Positive pigment additions are then generated using colorant adjustment data (vectors) obtained through step C which can bring the test batch to within predetermined standards of color exhibited by A without the aid of a human shader.

DESCRIPTION OF THE INVENTION

Normally any paint program is initiated to satisfy the aesthetic desires of the customer. Once this desire for a particular color has been satisfied, a standard color to which all subsequent batches must comply in visual appearance is obtained. This is represented by A as previously indicated.

The transition from visual to instrumental procedures for color adjustment and control first necessitated the development of techniques that make possible the preparation of samples which are both repeatable by the same person in a given production area and reproducible by different people in different production areas and at different times. The advent of metallic colors created a perplexing situation in the area of repeatability and reproducibility.

An instrumental shading system requires the use of a system which could coat a test panel to a high degree of visual consistency. For the purpose of this invention a controlled environment spray system could be used to duplicate test panels even though these panels may be sprayed at different times by different individuals. Therefore, any coating system which produced panels coated so as to visually appear very similar would be satisfactory. This is especially important since paints containing metal flake particles must be applied so as to effectuate a reproducible degree of particle orientation in order that the paint film be visually similar. This system is represented by block B.

This preferred spray system which is symbolized by block B of the drawing satisfies the major criteria of reproducibility and repeatability. This system enables one to prepare test panels sprayed with the paint which has been deemed acceptable by the customer in order to accurately determine a set of standards to which future batches of paint can be directed. The same technique is later used to prepare panels with the paint which is to be standardized thereby precluding the application technique from influencing predicted corrections.

Obviously, any mode of paint application to a test panel that can be controlled in varying situations such as time, place, operator, etc., would be suitable for adoption into this system. A controlled environment spray system is merely illustrative of a preferred system.

The ability to reproducibly spray metallic colors by itself, does not make it possible to instrumentally color adjust and control production batches. Color theory and instrumentation applicable to colored films that change color with viewing or illuminating angle had to be evolved and then reduced to every-day practice.

Prior work with non-metallic colors indicated that the Modified Adams Coordinate System would be a preferable coordinate system selection because of its very excellent agreement with perceived color and its relative simplicity. The color values expressed in the Modified Adams Coordinate System define color in terms of lightness, hue and saturation, the three dimensions of color.

The lightness coordinate is based on a scale of zero to 100, where zero represents the perfect black and 100 the perfect white. Between the poles exist shades of neutral gray. The lightness of any color can be positioned on this scale. The hue and saturation characteristics of any color are represented by the $a$ axis, the red/green attributes, the $b$ axis, the yellow/blue attributes. The saturation of a color is defined as the distance of the $a$ and $b$ values from the neutral gray of the $L$ axis. The greater the distance, the more saturated or cleaner the color.

Calculation of the $L$, $a$, $b$ values from measured tristimulus values (block C') utilizes the cube root equation.[2] ([2] L. G. Glasser, A. H. McKinney, C. D. Reilly, and P. D. Schnelle. "Cube Root Color Coordinate System," Journal of the Optical Society of America, Vol. 48, pages 736–740, October, 1958.)

The basic equations are:

$L = 25.29\, G^{1/3} - 18.38$ $a = 106\, (R^{1/3} - G^{1/3})$ $b = 42.34\, (G^{1/3} - B^{1/3})$ where $R_1 = 0.8R + 0.2B$ The Modified Adams System offers a degree of simplicity that is lacking in most other color order systems. Color differences existing between a batch and standard can be expressed as follows:

$\Delta L = L\,(\text{batch}) - L\,(\text{standard})$ $\Delta a = a\,(\text{batch}) - a\,(\text{standard})$ $\Delta b = b\,(\text{batch}) - b\,(\text{standard})$ $\Delta E = \sqrt{(\Delta L)^2 + (\Delta a)^2 + (\Delta b)^2}$ The resultant values agree with visual assessment.

Positive values of $\Delta L$ indicate the batch is lighter than standard, negative values indicate the batch is darker than standard. Positive $\Delta a$ values indicate the batch is redder (less green) than standard, negative $\Delta a$ indicates the batch is greener (less red) than standard. Similarly positive $\Delta b$ values indicate the batch is yellower (less blue) than standard, negative $\Delta b$ indicates the batch is bluer (less yellow) than standard. $\Delta E$ is the total color difference.

Color adjustment data (vector) previously were obtained by manual means, that is, physically weighing predetermined amounts of colorants into known compositions (formulas). Vector data are no longer prepared manually but are calculated via digital equipment using formula pigment composition and colorant characterization data. Colorant characterization data are derived from a series of color panels representing blends of each individual colorant with white and/or aluminum as characterized by block A'. Spectrophotometric curves are run on these panels and the constants, K (absorption) and S (scatter) values are calculated (block C) from the basic Kubelka-Munk equation.

$$K/S = (1-R)^2/2R$$

Where $R$ is the measured reflectance of the color at a given wavelength.

Characterization procedures for colorants can be found described in the literature common to the color art. These procedures are absolute methods and are predicated on measurements made on panels exhibiting various levels of hiding. Accuracy was primarily dependent on one's ability to measure film thickness. Experience indicates that a large number of color and film thickness measurements were required to achieve even a moderate level of precision. Although these methods could be successfully utilized, a simpler method is preferred.

The need for multiple measurements was eliminated by a new characterization technique. This technique used a combination of the basic Kubelka-Munk equation, the Duncan equation[3] ([3] D. R. Duncan, *Journal of the Oil and Color Chemists' Association*, Vol. 32, page 296 (1949).) (discussed later) and panels prepared at complete hiding to provide colorant characterization data. The scattering and absorption coefficients resulting from the application of this technique are relative rather than absolute, being relative to the standard white (or aluminum) utilized. Simplicity was achieved by assuming a fixed value of the scattering coefficient ($S_r$) for the standard white aluminum, or a mixture of white and aluminum used in characterization. Using this assumption, it is possible to calculate the absorption coefficient ($K_r$) for the reference colorant directly from the Kubelka-Munk equation. If $$K/S = (1-R)^2/2R$$

then $$K_r = (1-R)^2/2R \cdot S_r$$

The $K/S$ ratio of a mixture of a reference colorant and a second colorant can be calculated using the Duncan equation.

$$(K/S)_m = (C_r K_r + C_c K_c)/(C_r S_r + C_c S_c)$$

where $C_r$ and $C_c$ refer to the concentration of the reference color and the colorant respectively. The absorption ($K_c$) and scattering ($S_c$) coefficients determined are relative to a reference pigment or colorant, depending on the projected use. The only restrictions placed on the calculated coefficients, $K_c$, $S_c$ are that data for colorants used in a given composition be relative to a common reference and secondly, that they be used in colors matched at essentially complete hiding.

The calculation of vector data for a given composition is straightforward. The concentrations of the colorants are obtained from the formula, the $K_c$ and $S_c$ coefficients for each colorant have previously been determined with the result that the vector movement can be calculated differentially using the basic Duncan and Kubelka-Munk equations. The calculation of tristimulus values from reflectance data follows. This operation is characterized in block C of the drawing.

This data is then coded and punched onto a single input card for future use in the shading computer.

The manual aspects of both vector preparation and graphical shading economically restricted this early shading system to a few highly repetitive colors. These restrictions were overcome by the application of computers to the development of vectors (block C) and shading of batches (D of the drawing). Special-purpose analog shading computers now utilized and preferred were developed to solve the equations previously handled graphically. The computer is programmed for a positive solution in that all corrections to a batch are additions and are not "takeouts," a characteristic of many digital programs. With "takeouts," additional calculations are required to re-balance the formula. The computers of this invention are programmed in such a manner that the solution is the minimum addition of colorants required to adjust the batch to equal the standard color or to within a predetermined color tolerance. This is important since in a system containing more than four colorants, there are several possible solutions to a given color difference which can vary significantly in size.

In adapting color technology to metallic colors it was recognized that one would no longer be dealing with pigmented films that reflect light in an essentially diffuse pattern but would be faced with problems of directionality. Ideally, individual flake particles act like mirrors with their reflection efficiency being a function of their refractive index relative to the surrounding medium. Commercially available aluminum flake, however, is not optically flat but has an appearance in miniature of a crumpled piece of paper which has been partially smoothed out. The orientation of the flat and thin particles is rarely precisely parallel to the film surface and is more often semi-horizontal. Commercially available aluminums contain a fair portion of fine flake which because of their reduced size to thickness ratio are less likely to orientate themselves parallel to the film surface. These factors contribute to some dispersion of the directional characteristics of the reflected light.

Superimposed upon the imperfections of aluminum flake are the effect of the other pigments employed in the finish. In most cases these are fine particle size pigments but because of dispersion limitations they do possess a degree of scatter, further reducing directionality.

The directional reflectance characteristic of a metallic film results in phenomena most commonly referred to as "two-tone." Other names given this phenomena are "flop," "flip-flop," "flash," "side-tone," etc. Two-tone occurs when a panel is viewed at varying angles to incident light and by definition was considered to be the change in reflectance, $\Delta G$. The two-tone value is expressed as the ratio of two reflectance values, equating the phenomena as a function of lightness.

Metallic colors were considered to possess four dimensions, and an acceptable match would occur when lightness, hue, saturation and two-tone were adjusted to nearly equal or equal that of the standard. Mathematically, the three equations utilized in adjusting solid colors were supplemented by the two-tone equation:

$$-\Delta L = N_{c1}\Delta L_1 + N_{c2}\Delta L_2 + N_{c3}\Delta L_3 + \ldots + N_{c6}\Delta L_6$$

$$-\Delta a = N_{c1}\Delta a_1 + N_{c2}\Delta a_2 + N_{c3}\Delta a_3 + \ldots + N_{c6}\Delta a_6$$

$$-\Delta b = N_{c1}\Delta b_1 + N_{c2}\Delta b_2 + N_{c3}\Delta b_3 + \ldots + N_{c6}\Delta b_6$$

$$-\Delta TT = N_{c1}\Delta TT_1 + N_{c2}\Delta TT_2 + N_{c3}\Delta TT_3 + \ldots + N_{c6}\Delta TT_6$$

where:
- $-\Delta L$ is lightness difference existing between batch and standard
- $-\Delta a$) is hue and saturation difference existing between
- $-\Delta b$) batch and standard
- $-\Delta TT$ is two tone difference existing between batch and standard
- $\Delta L_1$)
- $\Delta a_1$) is color movement (vector) for colorant 1
- $\Delta b_1$)
- $\Delta TT_1$ is two tone movement vector for colorant 1
- $N_{c1}$ is percent of vector concentration required for colorant 1

Initially the four-dimensional concept based on the two-tone theory proved to be adequate. Metallic colors as first used in the automotive industry were difficult to differentiate optically from nonmetallic colors because they were so dark and/or contained so little metallic flake that their directional reflectance characteristics closely approximated the diffuse characteristics of solid colors. Over the years with better and more durable vehicle systems, the amount of aluminum flake sharply increased, resulting in the high glamor metallics of today.

As metallic colors increased in glamor, more and more metallic colors shaded in accordance with the four-dimensional concept were found to be visually objectionable though instrumentally acceptable. These batches when viewed visually in a manner to exclude side-tone considerations were judged to be good matches versus standard. It was noted that both viewing and measuring geometry were very similar. When batch panels were viewed at an oblique angle, significant differences were noted. Viewing and measuring geometry was not similar. A colorimeter was modified so that it was possible to measure tristimulus values of the metallic panel from horizontal to near vertical positions. Measurements involving panels that were instrumentally acceptable under the four-dimensional concept but visually objectionable were found to exhibit color differences at all measuring angles in the 45°, 0° position where they were judged visually to be acceptable. Batches judged to be visually and instrumentally acceptable when measured in a similar manner were found to exhibit near zero color differences regardless of the angle measured.

The dependence of side-tone color on hue and saturation characteristics, indicated that lightness per se could not adequately characterize side-tone. Measurement studies had shown that visual color differences existing between two metallic colors were detectable at an infinite number of angles. Through analysis of data, measuring positions were selected that made it possible to accurately describe color differences existing between two metallic colors regardless of angle. Preferably, the angles should be from 60° to 80° apart from optimal readings. Equally important, it was demonstrated that when the measured differences were reduced to near zero, the colors matched each other regardless of viewing angle. Color-adjusting a metallic was therefore analogous to shading two colors simultaneously, adjusting each for lightness, hue and saturation. A metallic color can be described by six coordinate values and by six color differences. By this analogy metallic colors are said to have six dimensions, solid colors three dimensions.

A generalized form of the equations for metallics would, therefore, be $$-\Delta L_F = Nc_{F1}\Delta L_{F1} + Nc_{F2}\Delta L_{F2} + Nc_{F3}\Delta L_{F3} + \ldots + Nc_{FN}\Delta L_{FN}$$

$$-\Delta a_F = Nc_{F1}\Delta a_{F1} + Nc_{F2}\Delta c_{F2} + Nc_{F3}\Delta a_{F3} + \ldots + Nc_{FN}\Delta a_{FN}$$

$$-\Delta b_F = Nc_{F1}\Delta b_{F1} + Nc_{F2}\Delta b_{F2} + Nc_{F3}\Delta b_{F3} + \ldots + Nc_{FN}\Delta b_{FN}$$

$$-\Delta L_H = Nc_{H1}\Delta L_{H1} + Nc_{H2}\Delta L_{H2} + Nc_{H3}\Delta L_{H3} + \ldots + Nc_{HN}\Delta L_{HN}$$

$$-\Delta a_H = Nc_{H1}\Delta a_{H1} + Nc_{H2}\Delta c_{H2} + Nc_{H3}\Delta a_{H3} + \ldots + Nc_{HN}\Delta a_{HN}$$

$$-\Delta b_H = Nc_{H1}\Delta b_{H1} + Nc_{H2}\Delta b_{H2} + Nc_{H3}\Delta b_3 + \ldots + Nc_{HN}\Delta b_{HN}$$

where $F$ and $H$ represent two different angles.

Color measurements are normally made using either a tristimulus colorimeter or a spectrophotometer.

The colorimeter was modified as previously mentioned to measure metallic colors at varying angles, preferably two distinct angles, making possible the calculation of the six dimensions that describe differences existing between two metallic colors. Although, measurements can be taken at a number of angles, only two are necessary for accurate determination of color properties. As previously indicated the gradient between these angles is preferably 60° to 80° though any angular difference could produce meaningful results. It should be noted that the angles used should be similar, preferably plus or minus 10°, more preferably plus or minus 5°, for readings taken to obtain spectral curves and those taken to yield tristimulus values.

To calculate Kubelka-Munk constants, K (absorption) and S (scatter) values, for use with metallic colors, it was necessary to modify a spectrophotometer in a manner that made it possible to measure reflectance curves across the visible spectrum at multi-angular positions (both in a horizontal and vertical plane). The spectrophotometer modified for our use was the commercially available Bausch and Lomb 505, however any Spectrophotometer could be so modified after analysis of viewing geometry. The aforementioned spectrophotometric determinations are represented by block C of the drawing.

The data obtained is related to the shading and color prediction operation making feasible the calculation of colorant data for use with metallics. A library of data for a given colorant therefore consists of one set of data (K, S values at several wavelengths) for use in nonmetallic finishes and at least two sets of data for use with metallic finishes. These data are used to calculate vectors (block C) for at least two distinct angles for standard formulas as characterized by block A.

Tristimulus determinations are used to determine the Δ values described earlier for test panels coated with the paint which is to be color shaded to the color standard (set ').

The tristimulus values are then transposed into the modified Adams Coordinates using the aforementioned cube root equations. The resultant $L$, $a$ and $b$ values serve to locate the color in color space. In comparing a batch versus a standard, color differences or delta values are obtained. These can be transposed into the single value E which can be used in the equation mentioned earlier with the Adams System. The National Bureau of Standards in Washington has defined an E value of 0.3 N.B.S. units as being only barely detectable to highly trained color personnel. A value of 1.0 N.B.S. unit is generally considered to be a good commercial match. Therefore, in view of the aforementioned procedures, to calculate a shading adjustment for a batch, the color differences existing between the batch and standard at multi-angles are determined using a colorimeter or spectrophotometer. These values plus the batch weight are then relayed to the computer. The computer operator enters these data plus the computer input card containing the vector data into the computer. The identity and amount of the colorants required in the color addition that must be added to the batch in order to obtain a theoretically perfect match is then calculated. The addition is expressed in amounts of colorant to be added to the batch. Ideally, for non-metallic colors, up to three colorants may be required, for metallic colors up to four colorants may be necessary. Utilizing color tolerance data, the computer operator can, if requested, determine the color addition required to adjust the batch to a point just within the tolerance zone. This can substantially affect the size of the addition that must be added to the batch and/or can reduce the number of colorants required to achieve an in-tolerance match.

UTILITY

Color technology can be successfully utilized in the finishes industry for color-adjusting (shading) of both metallic and nonmetallic colors. Production units can maintain a degree of color uniformity previously unattainable under visual systems and do this without personnel skilled in the art of visual shading nor at any loss in plant operating efficiency. Experience has shown that after initial start-up problems are resolved plant capacity has increased as a result of faster turnover of equipment through a more efficient shading operation. Plants can be operated completely without personnel skilled in the art of visual shading.

It should also be noted that this system can be used to adjust any physical property which can be mathematically expressed, e.g., gloss, hiding, etc. and predict adjustments to the batch accordingly.

DESCRIPTION OF THE PREFERRED EMBODIMENTS

The following example illustrate the various aspects of the invention in greater detail. However, it should be recognized that it is only illustrative. Variations from what is disclosed will undoubtedly occur to those skilled in the art, but will nevertheless be embraced by the inventive concept of the invention. All parts unless otherwise indicated are by weight.

EXAMPLE

A batch of metallic gold paint was color standardized in accord with the following:

1. A batch of paint was prepared which would be the color standard to which subsequent batches would be shaded.

2. Paints were prepared for each of the pigments contained in the paint of (1), each paint containing only one pigment and a set amount of aluminum flake. These paints were prepared at two different pigment/aluminum ratios along with a sprayout of an aluminum paint and a single pigment paint.

3. The paints of (2) were sprayed on test panels under controlled environmental conditions and K, S valves calculated at 31 points across the visible spectrum (at 10 nanometer intervals from 400 to 700 nanometers) on a Bausch and Lomb 505 spectrophotometer modified to allow multi-angular determinations. This procedure was performed at two angles —45° incident with 0° viewing angle and 25° incident with 70° viewing angle measured from the normal to the panel.

4. Vector data were calculated for the standard paint from the K, S values using the Duncan and Kubelka-Munk equations.

Vector data for standard metallic gold paint

| Colorant | Conc. | $\Delta L_F$ | $\Delta a_F$ | $\Delta b_F$ | $\Delta L_H$ | $\Delta a_H$ | $\Delta b_H$ |
|---|---|---|---|---|---|---|---|
| Hydrous Iron Oxide | 2.00 | −0.80 | +0.56 | +1.17 | −0.36 | +0.40 | +0.65 |
| Ferrite Yellow | 1.00 | −1.46 | −0.09 | +2.19 | +1.51 | −0.47 | +2.58 |
| Med. Coarse Aluminum | 5.00 | +2.95 | −1.43 | −2.59 | +1.06 | −0.97 | −1.53 |
| White | 0.25 | −1.22 | −0.05 | −0.34 | +2.28 | +0.63 | +0.67 |
| Back | 0.75 | −2.28 | −0.86 | −1.45 | −1.74 | −0.98 | −1.44 |
| Orange | 0.50 | −0.74 | +1.72 | +0.11 | −0.32 | +1.00 | +0.26 |

The above data are for the aforementioned dual angle positions— F (representing flat or 45°, 0°) and H (representing high or 25°, 70°).

The above vector data were punched onto a computer input card for shading reference.

5. A subsequent batch of metallic gold paint was prepared. In order to color shade this according to the constants already derived, a test panel was sprayed with the non-standardized paint using the same spray technique which was used to spray the standard paint. Readings were made on this test panel at the same angles— 45° incident with 0° viewing angle and 25° incident with 70° viewing angle— using a Colormaster colorimeter adapted to allow for multiangular measurements.

The color differences between the test panel and the standard were as follows:

$\Delta L_F = +2.76$     $\Delta L_H = -1.03$
$\Delta a_F = -2.43$     $\Delta a_H = -1.89$
$\Delta b_F = -1.24$     $\Delta b_H = -1.32$ 6. The aforementioned color differences were fed into a programmed analog computer available from Electronics Associates along with the computer input card containing the vector data for the standard. The calculated color addition required for a 5,000-gram batch was:

| Hydrous Iron Oxide | = 87 grams |
|---|---|
| White | = 7.4 grams |
| Black | = 1.1 grams |
| Orange | = 19.6 grams | where:

| $N_{c1}$ for hydrous iron oxide | = 1.16 |
|---|---|
| $N_{c4}$ for white | = 0.76 |
| $N_{c3}$ for black | = 0.05 |
| $N_{c4}$ for orange | = 1.04 |

The theoretical color differences, as predicted by the computer, after the above addition were:

$\Delta L_F = +0.02$
$\Delta a_F = -0.07$
$\Delta b_F = -0.10$ $\Delta L_H = -0.14$
$\Delta a_H = +0.04$
$\Delta b_H = +0.14$ These differences fall within the tolerance limit for the metallic gold paint.

We claim:

1. An apparatus for instrumentally shading colors according to a standard color in the manufacture of paints containing light reflecting particles comprising
   A. means for determining color constants (vector data) by use of spectral curves at multi angles on a test panel coated with a standard paint;
   B. means for determining differences at multi angles between the standard paint and a non-standard paint by use of tristimulus values; and,
   C. means for correlating differences of (B) with the color constants of (A) and calculating proper amounts of specific pigments which should be added to the non-standard paint to obtain a color match.

2. The apparatus of claim 1 wherein
   A. the means for determining color constants (vector data) by use of spectral curves on a test panel coated with a standard paint is a spectrophotometer modified in order that multi-angular measurements can be made;
   B. the means for determining color differences between the stand and a non-standard paint by use of tristimulus values is a colorimeter modified in order that multi-angular measurements can be made; and,
   C. the means for correlating the differences of (B) with the color constants of (A) and calculating proper amounts of specific pigments which should be added to the non-standard paint to obtain a color match is a computer specially programmed to resolve the equations:

$$-\Delta L_F = Nc_{F1}\Delta L_{F1} + Nc_{F2}\Delta L_{F2} + Nc_{F3}\Delta L_{F3} + \ldots + Nc_{FN}\Delta L_{FN}$$

$$-\Delta a_F = Nc_{F1}\Delta a_{F1} + Nc_{F2}\Delta c_{F2} + Nc_{F3}\Delta a_{F3} + \ldots + Nc_{FN}\Delta a_{FN}$$

$$-\Delta b_F = Nc_{F2}\Delta b_{F1} + Nc_{F2}\Delta b_{F2} + Nc_{F3}\Delta b_{F3} + \ldots + Nc_{FN}\Delta b_{FN}$$

$$-\Delta L_H = Nc_{H1}\Delta L_{H1} + Nc_{H2}\Delta L_{H2} + Nc_{H3}\Delta L_{H3} + \ldots + Nc_{HN}\Delta L_{HN}$$

$$-\Delta a_H = Nc_{H1}\Delta a_{H1} + Nc_{H2}\Delta c_{H2} + Nc_{H3}\Delta a_{H3} + \ldots + Nc_{HN}\Delta a_{HN}$$

$$-\Delta b_H = Nc_{H1}\Delta b_{H1} + Nc_{H2}\Delta b_{H2} + Nc_{H3}\Delta b_{H3} + \ldots + Nc_{HN}\Delta b_{HN}$$

where $F$ and $H$ represents two different angles.

3. A method of instrumentally color shading paints containing light reflecting metal flakes comprising
   A. deriving color constants (vector data) for a test panel coated with standard paint by multiangular spectrophotometric determinations;
   B. determining differences between the test panel and a panel similarly coated with paint from a batch which is to be shaded by obtaining tristimulus values using a colorimeter at the same angles as the aforementioned spectrophotometric determinations; and
   C. correlating the aforementioned differences and color constants and calculating amounts of specific pigment which should be added to the non-standardized batch to produce a color match with the standard paint.

4. The method of claim 3 wherein the standard and non-standard paints contain metallics and the color constants (vector data) for the standard paint are determined by multi-angular spectrophotometric measurements on panels coated individually with each pigment contained in the standard paint and a panel coated with only metal flake.

5. The method of claim 4 wherein the multi-angular measurements are limited to two angles which differ from each other by from 60° to 80°, said same angles being used for measurement by the spectrophotometer and colorimeter.

6. The method of claim 3 wherein a computer is used for correlating differences between the standard and non-standard paint and calculating amounts of pigment to be added to obtain a color match, said computer programmed to handle the equations:

$$-\Delta L_F = Nc_{F1}\Delta L_{F1} + Nc_{F2}\Delta L_{F2} + Nc_{F3}\Delta L_{F3} + \ldots + Nc_{FN}\Delta L_{FN}$$

$$-\Delta a_F = Nc_{F1}\Delta a_{F1} + Nc_{F2}\Delta c_{F2} + Nc_{F3}\Delta a_{F3} + \ldots + Nc_{FN}\Delta a_{FN}$$

$$-\Delta b_F = Nc_{F2}\Delta b_{F1} + Nc_{F2}\Delta h_{F2} + Nc_{F3}\Delta b_{F3} + \ldots + Nc_{FN}\Delta b_{FN}$$

$$-\Delta L_H = Nc_{H1}\Delta L_{H1} + Nc_{H2}\Delta L_{H2} + Nc_{H3}\Delta L_{H3} + \ldots + Nc_{HN}\Delta L_{HN}$$

$$-\Delta a_H = Nc_{H1}\Delta a_{H1} + Nc_{H2}\Delta c_{H2} + Nc_{H3}\Delta a_{H3} + \ldots + Nc_{HN}\Delta a_{HN}$$

$$-\Delta b_H = Nc_{H1}\Delta b_{H1} + Nc_{H2}\Delta b_{H2} + Nc_{H3}\Delta b_{H3} + \ldots + Nc_{HN}\Delta b_{HN}$$

where $F$ and $H$ represent two different angles.

* * * * *